(12) United States Patent
Sastry et al.

(10) Patent No.: US 10,126,449 B2
(45) Date of Patent: Nov. 13, 2018

(54) PRESENTING DATA IN A SCALABLE FORMAT

(71) Applicant: ENT. SERVICES DEVELOPMENT CORPORATION LP, Houston, TX (US)

(72) Inventors: Dhulipala Sastry, Bangalore (IN); Ravigopal Vennelakanti, Santa Clara, CA (US); Prasun Singh, Sunnyvale, CA (US)

(73) Assignee: Ent. Services Development Corporation LP, Houston, TX (US)

( * ) Notice: Subject to any disclaimer, the term of this patent is extended or adjusted under 35 U.S.C. 154(b) by 369 days.

(21) Appl. No.: 14/888,171

(22) PCT Filed: Jul. 22, 2013

(86) PCT No.: PCT/US2013/051488
§ 371 (c)(1),
(2) Date: Oct. 30, 2015

(87) PCT Pub. No.: WO2015/012793
PCT Pub. Date: Jan. 29, 2015

(65) Prior Publication Data
US 2016/0070015 A1    Mar. 10, 2016

(51) Int. Cl.
*G06F 11/30*  (2006.01)
*G01V 1/34*   (2006.01)
*G06F 11/34*  (2006.01)

(52) U.S. Cl.
CPC .......... *G01V 1/345* (2013.01); *G01V 2210/74* (2013.01)

(58) Field of Classification Search
CPC ..................................................... G01V 1/345
See application file for complete search history.

(56) References Cited

U.S. PATENT DOCUMENTS

| | | | |
|---|---|---|---|
| 6,223,126 B1 | 4/2001 | Neff et al. | |
| 2004/0204859 A1* | 10/2004 | Knobloch | G01V 1/34 702/16 |
| 2006/0258292 A1* | 11/2006 | Kato | G01V 1/008 455/67.11 |
| 2009/0034367 A1 | 2/2009 | Sherrill | |
| 2010/0095205 A1 | 4/2010 | Kinoshita | |
| 2011/0270526 A1 | 11/2011 | Welker | |

FOREIGN PATENT DOCUMENTS

| | | |
|---|---|---|
| CN | 1570993 | 1/2005 |
| CN | 101523331 | 9/2009 |

OTHER PUBLICATIONS

PCT Search Report/Written Opinion—Application No. PCT/US2013/051488 dated Apr. 16, 2014—9 pages.

* cited by examiner

*Primary Examiner* — Phuong Huynh
(74) *Attorney, Agent, or Firm* — Sheppard Mullin Richter & Hampton LLP

(57) ABSTRACT

Presenting data in a scalable format includes obtaining input from multiple sensors, grouping a subset of the multiple sensors based on similar parameter values, and allocating a section of a display screen to the subset based on a number of the multiple sensors in the subset.

15 Claims, 4 Drawing Sheets

PRESENTING DATA IN A SCALABLE FORMAT

BACKGROUND

Seismic surveys are used to determine whether a subterranean structure has oil, gas, or other extractable natural resources. Such surveys are also used to determine how to extract such natural resources. A seismic survey conducted over dry land usually includes positioning between 100,000 and 200,000 geophones across the surface of an area superjacent the subterranean formation of interest. The geophones are hardwired together. Either natural or induced acoustic vibrations that pass through the subterranean formation are recorded with the geophones. The time of flight from induced acoustic vibrations and other acoustic characteristics are used to determine if the subterranean formation has a structure that is likely to contain the natural resource of interest and, if so, an extraction plan based on the subterranean formation's structure is developed to extract the natural resource.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Geophones are wired devices used in seismic surveys for recording seismic data in real time, but they have limitations due to the scalability of such wired systems. The principles described herein incorporate the use wireless sensors in seismic surveys that are capable of sending sensor health and seismic data to a presenting system in near real time. Such sensors may send their sensor health and seismic data to the presenting system on a periodic basis that is less than one minute (e.g. twenty seconds) or upon request. Such information can be used to determine how the equipment for conducting the seismic survey is operating, determine battery life, or determine subterranean structures based on the seismic.

Over a million wireless sensors may be used in the seismic survey, which is a significant increase over the traditional seismic surveys. Displaying recorded data points from over a million sensors in an intuitive way such that the displayed information is useful for an operator in real time is challenging because millions of data points are difficult to display in a conventional computer screen. To complicate matters, mobile devices, which have smaller screens, are becoming main stream. Thus, a user desiring to use a mobile device will have increased difficultly sorting through millions of data points on the mobile device's smaller screens.

The principles described herein include a method for presenting data in a scalable format. Such a method may include obtaining input from multiple sensors, grouping a subset of the multiple sensors based on similar parameter values, and allocating a section of a display screen to the subset based on a number of the multiple sensors in the subset. By grouping data with similar parameter values, the amount of information displayed to the user simultaneously is reduced. In such an example, the data of most interest to the user is highlighted. The user still has an option of drilling down deeper into the information, if the user desires to see more details about a particular group of sensors.

In the following description, for purposes of explanation, numerous specific details are set forth in order to provide a thorough understanding of the present systems and methods, It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
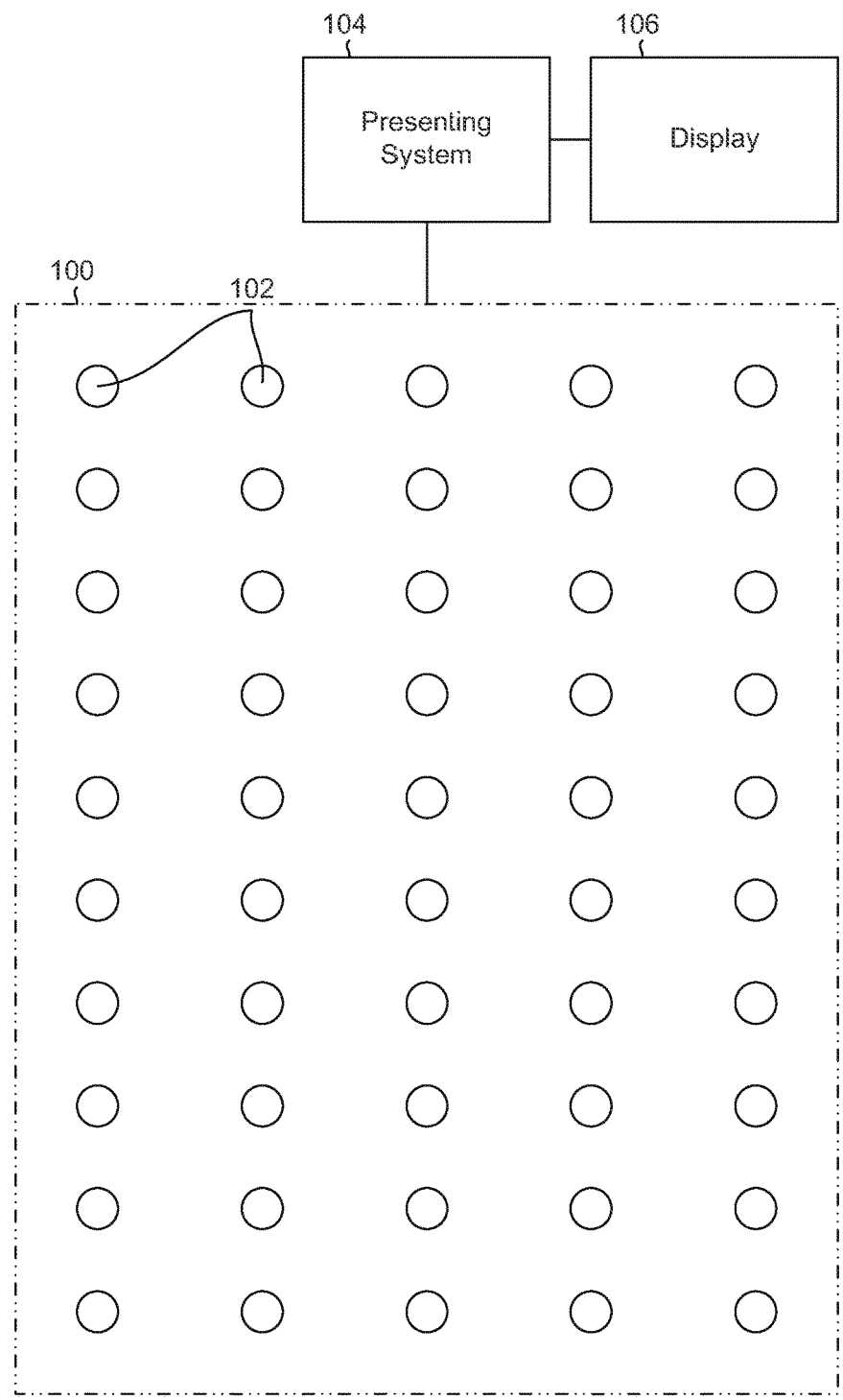
FIG. 1 is a diagram of an example of an area with wireless sensors deposited throughout the area according to the principles described herein.

FIG. 1 is a diagram of an example of an area (100) with wireless sensors (102) deposited throughout the area (100) according to the principles described herein. In this example, the area (100) is superjacent a subterranean formation, and multiple wireless sensors (102) are deposited throughout the area (100). Each of the sensors records geophysical data about the subterranean formation such as acoustic information. For example, a tool may induce a vibration into the subterranean formation and the acoustic signals reflected by the subterranean formation from such induced vibrations are recorded with the sensors (102).

The tool for inducing the vibrations may be activated on the surface proximate the area (100), on the surface within the area (100), in a drilled hole near the subterranean formation of interest, in a drilled hole within the subterranean formation of interest, underground, other locations, or combinations thereof. Tools for inducing the vibrations include explosives, thumper trucks, hammers, other acoustic sources, or combinations thereof. Also, the sensors (102) may record other geophysical data, such as temperature, error codes, tilt, other geophysical characteristics, or combinations thereof. The sensors may also measure gravity, electrical characteristics of the subterranean formation, magnetic properties of the subterranean formation, other characteristics of the subterranean formation, or combinations thereof.

While the example of FIG. 1 is described with reference to wireless sensors deposited throughout an area, the principles described herein include sensors that are deposited in down-hole locations, hard wired sensors, sensors deposited on a surface, sensors deposited in machinery or other equipment, other locations or conditions, or combinations thereof. For example, the sensors may be incorporated into a data center, oil field infrastructure, off shore drilling platforms, factories, buildings, networks, aircraft, vehicles, vehicle fleets, surveillance equipment, global positioning units, mobile devices, other locations, other devices, other systems, or combinations thereof.

A presenting system (104) obtains data from the sensors (102) wirelessly. The sensor quality data may be automatically sent to the presenting system (104) on a periodic basis. The periodic basis may be five minutes or less, every minute or less, every half minute or less, every twenty seconds or less, every ten seconds or less, other time periods, or combinations thereof. In other examples, the presenting system (104) requests the data from the sensors (102), and the sensors (104) send the data in response to the presenting system's request.

Any appropriate type of information may be obtained by the presenting system (104) from the sensors. For example, geophysical data, signal strengths, maximum signal amplitudes, minimum signal amplitudes, averages, compressed signals, processed data, repetitive data, raw data, operational data, battery data, bandwidth data, interference data, thermal data, processing data, memory data, other types of data, or combinations thereof may be used in accordance with the principles described herein.

For example, the data may provide an update on the system status of the sensors or other devices deployed for conducting the survey. The data may also include seismic characteristics such as the signal's root mean square, values peak amplitudes, other characteristics, or combinations thereof to detect the energy (signal to noise ratio) in the field. Both system and seismic data may amount to over fifty megabytes for each report sent on a periodic basis. The data obtained with the presenting system (104) may also include trace data aimed at probing target receiver sensor lines that have thousands of sensor trace data to create stacked traces.

The data may also include metrics either captured or derived to control and monitor operational aspects of the survey, such as deployment of sensors, retrieval of sensors, provisioning of sensors, charging of sensors, other aspects, or combinations thereof. Such operational aspects can include over a hundred and fifty attributes of the survey process model. The principles described herein provide the ability to make operational decisions and to determine whether to perform an operation, such as a seismic survey, within predetermined time periods.

In response to obtaining the data points from the sensors (102) and data from other subsystems such as a source controller, vehicle management system, and so forth, the presenting system (104) determines the values of certain parameters sent from each of the sensors. For examples, if the selected parameter is battery life, the presenting system (104) determines how much battery life is remaining in each of the sensors. In this example, the amount of remaining battery life is a parameter value.

The presenting system (104) then groups the sensors based on the similarity of their parameter values. For example, each sensor that has a battery life value between one and four hours may be grouped into a single group. Another group may include those sensors that have a battery life between four hours and eight hours. A third group of sensors may include those sensors that have a battery life less than one hour.

The group may be based on parameter value ranges, such as described above. However, in other examples, the groups may be based on binary considerations. For example, one group may include the sensors that have any remaining battery life, and another group may include those sensors that do not have any remaining battery life.

Any appropriate mechanism may be used to group the sensors. For example, the sensors may be assigned to predetermined groups. In other examples, the group values may be determined based on the existing parameter values. For example, if the input obtained by the presenting system (104) determines that a significant number of the sensors have a parameter value within a specific range, the presenting system (104) may create a group that matches that range. The grouping mechanism may include value based spatial-temporal clustering, density based clustering, mathematic based clustering, incremental step aggregate clustering, other mechanisms, or combinations thereof.

Further, the parameter value may be based on any appropriate parameter. For example, the parameter value may include battery life values, temperature values, signal strength values, failure values, memory values, operational values, other values, or combinations thereof.

The presenting system (104) can determine the amount of screen space available to display information about the sensors. For example, the presenting system (104) may be in communication with a display (106) that has a specific screen size. The screen may be part of a mobile device, like a mobile phone or an electronic tablet, or the screen may be part of a laptop, a desktop, a display monitor, another electronic device, or combinations thereof. The presenting system may determine the dimensions of the display screen to determine how much space is available to display information relating to the sensors.

The presenting system (104) can have a user interface that allows the user to input which display screen to display the sensor's information. In response to designating the screen to display the information, the presenting system may ascertain from the screen the screen's dimensions. In other examples, the user inputs the screen size.

The display (106) may be in hard wired communication with the presenting system (104), in wireless communication with the presenting system (104), or combinations thereof. The display (106) may be incorporated into a fixed location where the user makes decisions. The fixed location may be an onsite location proximate to the area, a remote location in satellite communication with the area, another location, or combinations thereof.

After determining the screen's dimensions, the presenting system (104) allocates sections of the screen to the groups. For example, if the presenting system (104) has grouped the sensors into two groups where a first group represents those sensors with a battery life and a second group with those sensors that do not have a battery life, the presenting system will allocate a screen section to the first and second groups. The sections' sizes may be based on the number of sensors in each group. For example, if the first group has eighty percent of the sensors and the second group has twenty percent of its sensors, the presenting system (104) may allocate eighty percent of the screen space to the first group and twenty percent of the screen space to the second group. While this example describes the allocation to be based on a proportional allocation, the allocation may be determined with other mechanisms. For examples, the allocation may be proportional, logarithmic, exponential, parabolic, or asymptotic.

Further, the location of the allocated spaces on the screen may map to the physical locations of the sensors. For example, if the first group mostly includes sensors that are located in a middle region of the field where the sensors are deployed, a corresponding location in the middle of the display screen can be allocated to the first group, Thus, the display will preserve the spatial order of the sensors.

The display screen may display a color in the allocated screen space that represents the parameter value for that particular group. For example, the first group may have a green color that represents that the sensors that have power, while the second group may have a red color that represents those that sensors do not have any power. As a result, the user can visually understand globally which areas of the field have power and which do not because the user can see the colors that represent the parameter values and the user can associate the allocated sections of the screen with the sensors' spatial location in the field. Thus, the user can make real time decisions based on the presented information even though the sensors are sending an overwhelming amount of data to the presenting system (104). The principles described herein allow the user to see the specific type of data that is most interesting to the user, which may include user specified parameters, anomalous behaviors, other types of information, or combinations thereof.

The display may be an interactive display (106) that allows the user to interact with the information presented in the display (106). The user can command the display (106) to switch from one presentation based on a first type of parameter value to a second type of parameter value. Further, the user can instruct the presentation to display additional details about a particular group of sensors. For example, the user may select one of the groups depicted in the display and drill down to get more data. By selecting the allocated region, the display screen may zoom into the sensors to give the user additional detail. Further, the user may control the screen with zoom commands, pan commands, transform commands, rotate commands, other types of graphical commands, or combinations thereof. The user can interact with the display with any appropriate user input, such as a key board input, a voice recognition input, a touch screen input, an auditory input, a motion detectable hand gesture input, another type of input, or combinations thereof.

Figure 2:
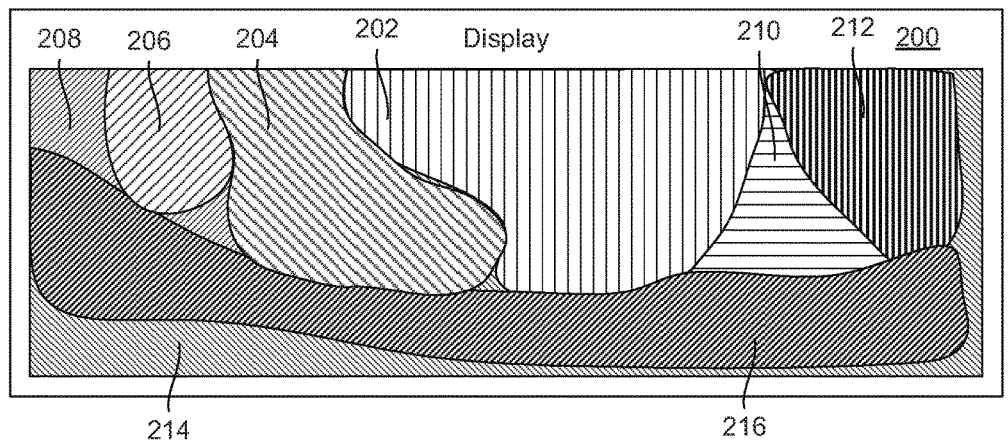
FIG. 2 is a diagram of an example of a display according to the principles described herein.

FIG. 2 is a diagram of an example of a display (200) according to the principles described herein. In this example, the display (200) depicts eight sections, a first section (202), a second section (204), a third section (206), a fourth section (208), a fifth section (210), a sixth section (212), a seventh section (214), and an eighth section (216). A first color is displayed in the first section (202) that represents the parameter value(s) of the first section. For example, the first color may represent sensors exhibiting a first temperature range. Further, the screen location of the first section (202) may correspond to a spatial location of the sensors in the field. A second color is depicted in the second section (204). The second color represents sensors that depict a second temperature or a second range of temperatures that is different than the temperature value(s) depicted in the first section.

Each of the sections (202, 204, 206, 208, 210, 212, 214, 216) may depict different colors that represent different parameter values. In other examples, the number of the sensors that correspond to each group of sensors for each of the sections (202, 204, 206, 208, 210, 212, 214, 216) may be displayed in the screen within the appropriate sections.

The user may drill down to get additional information about each of the groups of sensors by interacting with the screen with appropriate user inputs. For example, the user may select the first section (202) to determine its parameter value, latest timestamp, longitude and latitude locations of the corresponding sensors in the field, other information, or combinations thereof. Some of the user interactions may include zooming commands, panning commands, transforming commands, other types of commands, or combinations thereof.

A user may command the screen to zoom in to give the user additional details about the sensors, which will cause some of the information to be moved off of the screen. As a result, just a portion of the available information will be visible. In such an example, the user may pan the screen over to the information that was previously moved off of the screen.

Figure 3:
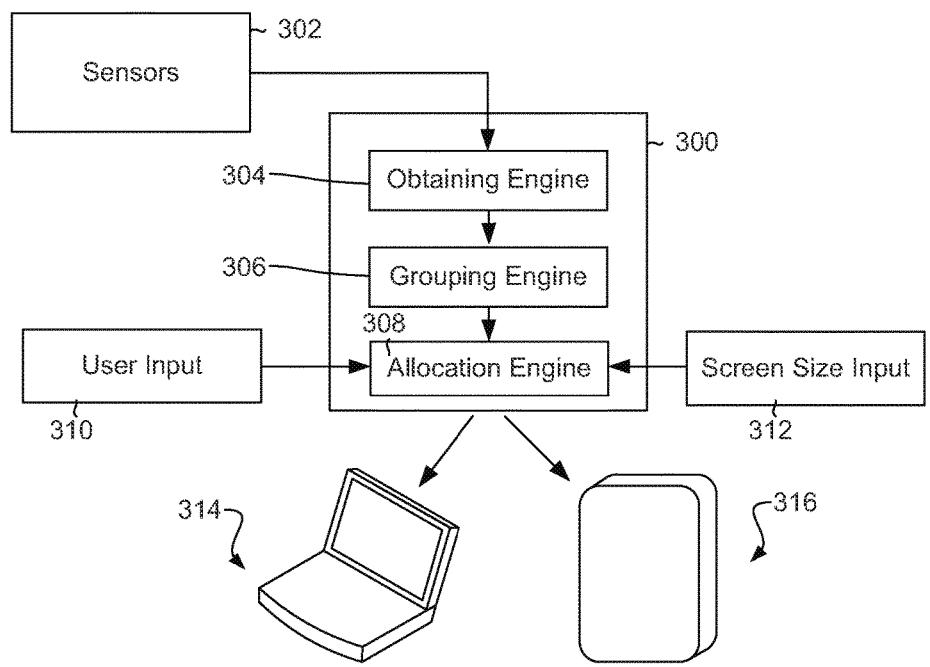
FIG. 3 is a diagram of an example of a presenting system according to the principles described herein.

FIG. 3 is a diagram of an example of a presenting system (300) according to the principles described herein. In this example, the presenting system (300) obtains information from sensors (302) deployed in a geographic area in real time or near real time with an obtaining engine (304). The obtaining engine (304) may actively acquire the data from the sensors (302) or the obtaining engine (304) may passively receive the data from the sensors (302).

A grouping engine (306) groups the sensors based on the obtained information. Each group of sensors represents a subset of the total number of sensors from the geographic area. The grouping engine (306) may provide a number of each of the groups to the allocation engine (308). The allocation engine (308) may also receive commands from user input (310) and screen size input (312). Based on the information received by the allocation engine (308), the allocation engine (308) allocates screen space to the groups. The allocation engine (308) may allocate the space proportionally by dividing the number of sensors in a specific group into the total number of sensors within the geographic area.

After allocating the screen space, the presenting system (300) causes the selected parameter values to be displayed within a screen. The presenting system (300) may cause the information to be displayed in a laptop (314), a desktop, a mobile device (316), or another type of device with a screen. The presenting system (300) has an ability to scale the way that the information is depicted based on the screen size and on user instructions. For example, the presenting system (300) may initially cause the information to be depicted such that all of the information is displayed in the screen, and the user may instruct the presenting system (300) to zoom into the information thereby causing some of the information to be moved off of the screen. For that information that is moved off of the screen, the user can view that information by panning over to that information or zooming out so that information is depicted in the screen again.

Figure 4A:
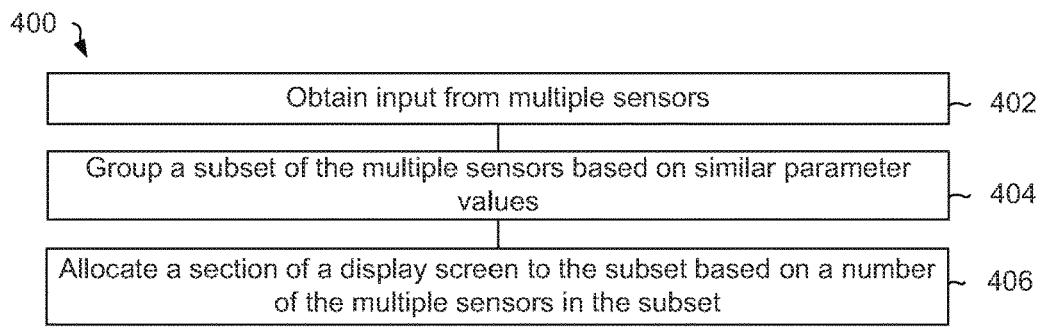
FIG. 4A is a diagram of an example of a method for presenting data in a scalable format according to the principles described herein.

FIG. 4A is a diagram of an example of a method (400) for presenting data in a scalable format according to the principles described herein. In this example, the method (400) includes obtaining (402) input from multiple sensors, grouping (404) a subset of the multiple sensors based on similar parameter values, and allocating (406) a section of a display screen to the subset based on a number of the multiple sensors in the subset.

The method may further include displaying a color that represents the similar parameter values in the allocated sections. In other examples, the method may also include display details associated with the subset of the multiple sensors in response to user input. For example, the user may instruct a display screen or the presenting system to drill down to show additional details about a particular subset. Further, each of the sections may have a screen location that maps to a physical location of the multiple sensors in the geographic region where the sensors are deployed.

The sensors may be seismic sensors or other types of sensors that are positioned to measure geophysical data. For example, the sensors may be positioned to measure seismic data, resistivity data, density data, gravity data, radiation data, acoustic data, other types of geophysical data, or combinations thereof. However, in other examples, the sensors may be used to measure other types of data other than geophysical data. The sensors may be in communication with the presenting system wirelessly or with tangible cables.

Allocating the screen section space to the groups may include determining the number of the multiple sensors in the subset. In some examples, allocating the screen section space to the groups may include dividing the number of the multiple sensors into a total number of the multiple sensors to determine an allocation percentage.

The principles described herein include identifying similar parameter values based on aggregation (grouping). The principles described herein also include accounting for each isolated instance of occurrence in deriving similarity aggregates, along with all other multiple-entity spatially co-located item aggregates. The similarity aggregates can be arrived by grouping and/or clustering methods. The similarity criteria can be selected and tuned for identifying context-sensitive and/or situational aware similar behavior groups. Multiple visualization schemes can be linked with the aggregate groups to display varying degrees of detail. If it is not feasible to depict clear detail in the screen, overlapped mapping can be used. For example, overlapped mapping may include displaying each of the groups in their appropriate locations in the screen, but some of the group will be overlapped by other groups. In such an example, the user can select the group of interest which will bring the selected group to the foreground to provide the user with the desired information.

The similarity groups with their members are allocated available screen space on any appropriate basis. By allocating space based on the amount of available space, the total number of data points that will be displayed are reduced in number, but the spatial position of the data points presented in the display screen is preserved. The distribution of the screen size can be based on an appropriate mathematical approach such as proportional approaches, logarithmic approaches, exponential approaches, parabolic approaches, or asymptotic variation approaches. Each mathematical approach continues to preserve the spatial order of the selected data points. If a user desires to preserve all the aggregate set members, a roll-up/roll-down mechanism can be applied to display items above or below in a lateral direction at the allotted spatial location. Graphical projections can be used to magnify desired details while drilling down and smoothly merging with the overview while zooming out.

The similarity aggregation can also be based on a time of usage or number of times parameter. In such an example, a user can select various modes of arrangement for the symbols and/or icons on the screen that would be convenient for the user. The principles described herein can present a user-selectable choice of arrangements such as latest inputs, most used information, user preferences, categorized attributes, user interest, or any appropriate attributes or behavioral patterns of a user-specified context. This arrangement may be coupled with a prioritized forced order that will open-up opportunities in using mobile devices for engineering and/or enterprise systems.

The user may interact with an application graphical interface to control the application or to observe system phenomena via screen display visualizations. The presenting system can query the application and get the data points from the sensors. In this architecture, after fetching data, the data is analyzed to determine conformal mapping and/or scaling to the appropriate screen space. A similarity aggregation by spatial-temporal aggregation mechanism can be performed to obtain entity groups having similar values in the selected aggregation parameters.

Context-sensitivity, corresponding layered displays, and combined graphical transformations of user-interested scenarios can be built-in the presenting system. For example, a zoomed display to various degrees of detail is appropriate for a generic zoom of overall system space in one user context. In another user context, a modified zoom of user interest region is appropriate. In other scenarios, the user can instruct the presenting system to give an overview depiction of a concerned phenomenon. So, the principles described herein provide an adaptive visualization engine that is both tunable for auto or manual operations while keeping the rendering to fit within the available screen space.

The principles described herein also include displaying the context of the information displayed in the screen. For example, a user may have different concerns about the battery life of the sensor when the sensors are first deployed than when the seismic survey is near completion. Further, the user may have different types of information that the user desires to see during different operations of the seismic survey. Additionally, the user may prefer to see the desired information in different ways. The principles described herein allow for the user to identify the user preferences for how the user wants such desired information to be displayed. Thus, the user can have the desired information displayed in a customized format based on user Input. For example, at the beginning of the seismic survey, the user may desire to see an overview of the entire field. Thus, the user may cause the program to display an overview of the entire field through user input, and the presenting system may remember such commands. As a result, the presenting system may cause the overview of the entire field to be displayed during the beginning of future surveys. In other examples, the user may prefer to have the display pan through the field towards the end of the survey. Thus, during the end of future surveys, the presenting system may pan through the field as specified by the user during earlier surveys.

Figure 4B:
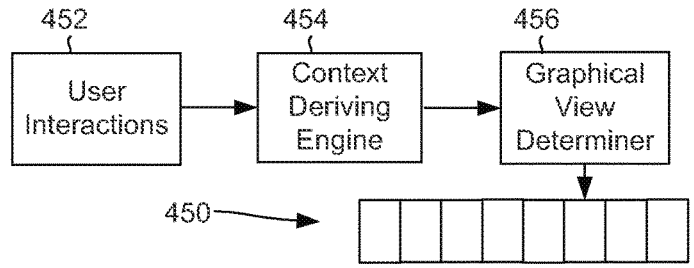
FIG. 4B is a diagram of an example of creating a data structure for a graphical transformation store according to the principles described herein.

The presenting system may have default settings that cause the display to have a specific graphical view for each stage of the survey. The user may have the option to change such settings. In some examples, the presenting system remembers the commands made by the user during earlier surveys. The user may dynamically change the graphical views as commanded by the user. The various graphical views may be inputted into a graphical transformation store, which will be described in more detail below, FIG. 4B is a diagram of an example of creating a data structure (450) for a graphical transformation store according to the principles described herein. In this example, the user input (452) is captured from the commands made by the user. A context deriving engine (454) determines the context around the commands. For example, the context deriving engine (454) may determine which stage of the survey that the seismic survey is in when the commands are made through user input. Further, the context deriving engine (454) may determine which information that the user desires to see during that stage and also how the user desires to see the desired information with a graphic view determiner (456).

Each set of desired information may be associated with a specific graphical view. The combination of the set of desired information and the specific graphical view may be assigned a number or another type of symbol. Thus, the presenting system may use the appropriate number to determine which graphic view to display when the user commands the presenting system to display the desired information as appropriate. This number is stored in the data structure (450) that forms the graphical transformation store.

While the current example has been described with reference to specific stages of the survey, the survey may have any appropriate type of stage. For example, the survey may include prestart stages, survey plan stages, sensor deployment stages, survey import stages, mobilization stages, operational stages, equipment movement stages, network management stages, registration stages, command stages, setup stages, seismic source deployment stages, system readiness stages, acquisition test stages, initial seismic acquisition stages, seismic data acquisition stages, sensor retrieval stages, battery charge stages, asset management stages, ending survey stages, other types of stages, or combinations thereof.

The user may cause the presenting system to display each of the desired information types for each of the stages through any appropriate user selection commands. For example, the presenting system may provide menu selections options, item selections, other selection options, or combinations thereof.

Figure 5:
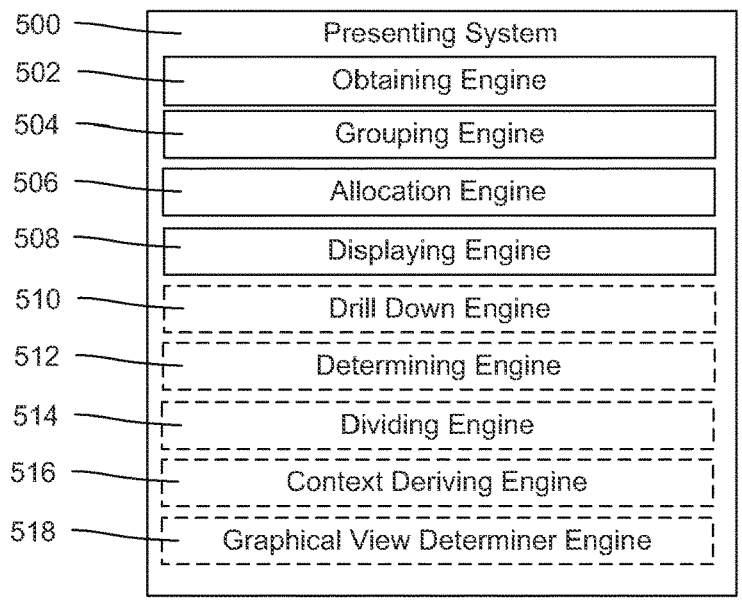
FIG. 5 is a diagram of an example of a presenting system according to the principles described herein.

FIG. 5 is a diagram of an example of a presenting system (500) according to the principles described herein. The presenting system (500) includes an obtaining engine (502), a grouping engine (504), an allocation engine (506), and a displaying engine (508). In this example, the presenting system (500) also includes a drill down engine (510), a determining engine (512), a dividing engine (514), a context deriving engine (516), and a graphical view determiner engine (518). The engines (502, 504, 506, 508, 510, 512, 514, 516, 518) refer to a combination of hardware and program instructions to perform a designated function. Each of the engines (502, 504, 506, 508, 510, 512, 514, 516, 518) may include a processor and memory. The program instructions are stored in the memory and cause the processor to execute the designated function of the engine.

The obtaining engine (502) obtains input from the sensors. The obtaining engine (502) may passively receive the input, actively retrieve the data from sensors, or combinations thereof. The grouping engine (504) groups the sensors based on the input obtained with the obtaining engine (502). The grouping engine (504) may base its groupings on similar parameter values exhibited by the sensors.

The determining engine (512) determines the number of sensors within each of the groups created by the grouping engine (504). The allocation engine (506) allocates screen space to each of the groups based on the amount of screen space available. In some examples, the allocation engine (506) consults with the dividing engine (514), which divides the number of sensors within a group into the total number of sensors within the geographic region where the sensors are deployed. The dividing engine (514) can provide the allocation engine (506) proportional information from which the allocation engine (506) can use to make its allocations.

The displaying engine (508) displays a color that represents the parameter values of each of the groups. The drill down engine (510) allows the user to drill down to view additional details about the groups of sensors depicted in the screen.

The context deriving engine (516) determines the context surrounding the information that a user desires to be presented in the presenting system. The graphical view determiner engine (518) determines the graphical view to display such desired information based on the user's input.

Figure 6:
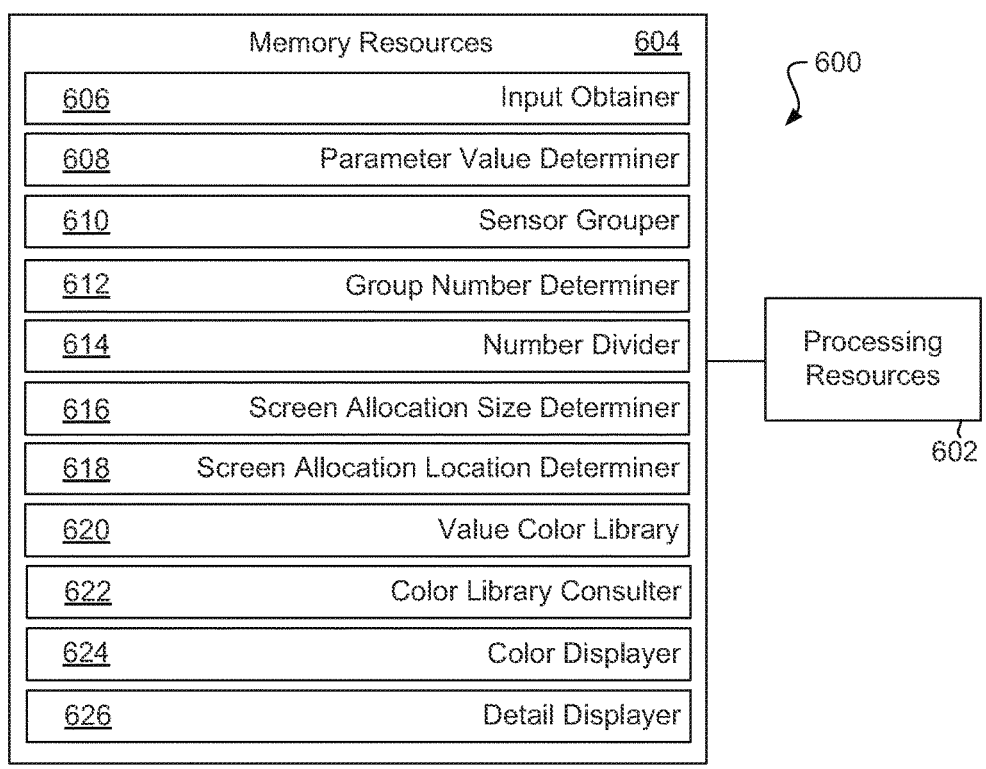
FIG. 6 is a diagram of an example of a presenting system according to the principles described herein.

FIG. 6 is a diagram of an example of a presenting system (600) according to the principles described herein. In this example, the presenting system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the presenting system (600). The programmed instructions shown stored in the memory resources (604) include an input obtainer (606), a parameter value determiner (608), a sensor grouper (610), a group number determiner (612), a number divider (614), a screen allocation size determiner (616), a screen allocation location determiner (618), a color library consulter (622), a color displayer (624), and a detail displayer (626). The data structures shown stored in the memory resources (604) include a value color library (620).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The input obtainer (606) represents programmed instructions that, when executed, cause the processing resources (602) to obtain input from sensors. The parameter value determiner (608) represents programmed instructions that, when executed, cause the processing resources (602) to determine the similar parameters values of each of the sensors based on the obtained input from the sensors. The sensor grouper (610) represents programmed instructions that, when executed, cause the processing resources (602) to group the sensors based on the similarity of their parameter values.

The group number determiner (612) represents programmed instructions that, when executed, cause the processing resources (602) to determine the number of sensors in the groups formed by the sensor grouper (610). The number divider (614) represents programmed instructions that, when executed, cause the processing resources (602) to divide the number of the sensors in a group into the total number of sensors to determine the group's sensor percentage. The screen avocation size determiner (616) represents programmed instructions that, when executed, cause the processing resources (602) to determine the size that the groups will have based on the screen size that is available. The screen allocation location determiner (618) represents programmed instructions that, when executed, cause the processing resources (602) to determine the location of the section for each group such that the allocated section visually appears to correspond with the physical location of the sensors in the field. For example, if the sensors deployed in the field are physically located in the middle of the field, the allocated section in the screen will be in the middle of the screen so that the spatial order of the sensors is preserved.

The color library consulter (622) represents programmed instructions that, when executed, cause the processing resources (602) to consult the color library to determine which color should be depicted in the sections that represents each of the groups. The color displayer (624) represents programmed instructions that, when executed, cause the processing resources (602) to display the color that represents the parameter values of the group. The detail displayer (626) represents programmed instructions that, when executed, cause the processing resources (602) to display the details of the sections in response to user input indicating that the user desires to see the additional details.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries and may be accessed from a remote location over a network connection while the programmed instructions are located locally. Thus, the presenting system (600) may be implemented on a user device, on a server, on a collection of servers, or combinations thereof.

The presenting system (600) of FIG. 6 may be part of a general purpose computer. However, in alternative examples, the presenting system (600) is part of an application specific integrated circuit.

While above examples have been described with reference to specific mechanisms for obtaining data from the sensors, any appropriate mechanism for obtaining data may be used in accordance with the principles described herein. Further, while the examples above have been described with reference to specific parameter values for grouping the sensors, any appropriate parameter values may be used in accordance with the principles described herein. For example, the parameters may be based on operating parameters of the sensors, the actual data recorded by the sensors, the conditions surrounding the sensors, other types of information, or combinations thereof.

Also, while the examples above have been described with reference to specific mechanisms for allocating the screen space to the groups, any appropriate mechanism for allocating the screen space may be used in accordance with the principles described herein. Further, while the examples above have been described with reference to specific ways for determining the color to display in the allocated sections, any appropriate mechanism for determining the group's color may be used in accordance with the principles described herein.

The above examples have been described above with reference to specific mechanism for drilling down to view additional details about the groups. However, any appropriate mechanism for drilling down to view additional detail may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for presenting data in a scalable format, comprising:
   obtaining input from multiple sensors, wherein said multiple sensors are configured to measure data, and wherein said input includes parameter values associated with said multiple sensors;
   grouping a subset of said multiple sensors based on similar parameter values; and
   allocating a section of a display screen to said subset based on a number of said multiple sensors in said subset, wherein allocating said section of said display screen to said subset includes dividing a number of said multiple sensors in said subset into a total number of said multiple sensors to determine a size of the section.

2. The method of claim 1, further comprising displaying a color that represents said similar parameter values in said section.

3. The method of claim 2, further comprising displaying details associated with said subset of said multiple sensors in response to user input.

4. The method of claim 1, wherein allocating said section of said display screen to said subset based on said number of said multiple sensors in said subset includes determining said number of said multiple sensors in said subset.

5. The method of claim 1, wherein allocating said section of said display screen to said subset based on said number of said multiple sensors in said subset includes dividing said number of said multiple sensors into a total number of said multiple sensors to determine an allocation percentage.

6. The method of claim 1, wherein said section includes a screen location that maps to a physical location of said multiple sensors in a geographic region.

7. The method of claim 1, wherein said multiple sensors are seismic sensors positioned to measure seismic activity within a geographic region.

8. The method of claim 1, wherein said similar parameter values are battery life values, temperature values, signal strength values, failure values, or combinations thereof.

9. The method of claim 1, wherein said multiple sensors are wireless sensors.

10. A system for presenting data in a scalable format, comprising:
    an obtaining engine to obtain input from multiple sensors, wherein said multiple sensors are configured to measure data, and wherein said input includes parameter values associated with said multiple sensors;
    a grouping engine to group a subset of said multiple sensors based on similar parameter values;
    an allocation engine to allocate a section of a display screen to said subset based on a number of said multiple sensors in said subset, wherein said allocation engine to allocate said section of said display screen to said subset includes dividing a number of said multiple sensors in said subset into a total number of said multiple sensors to determine a size of the section; and
    a displaying engine to display a color that represents said similar parameter values in said section.

11. The system of claim 10, further comprising a drill down engine to display details associated with said subset of sensors in response to user input.

12. The system of claim 10, wherein said section includes a screen location that maps to a physical location of said multiple sensors in a geographic region.

13. The system of claim 10, wherein said allocation engine to further allocate said section by dividing said number of said multiple sensors into a total number of said multiple sensors to determine an allocation percentage.

14. The system of claim 10, further comprising a graphic view determiner to determine the graphical view to display information based on said parameter values.

15. A computer program product for presenting data in a scalable format, comprising:
- a non-transitory computer readable storage medium, said non-transitory computer readable storage medium comprising computer readable program code embodied therewith, said computer readable program code comprising program instructions that, when executed, causes a processor to:
  - obtain input from multiple sensors, wherein said multiple sensors are configured to measure data, and wherein said input includes parameter values associated with said multiple sensors;
  - group a subset of said multiple sensors based on similar parameter values; determine a number of said multiple sensors in said subset;
  - allocate a section of a display screen to said subset based on a number of said multiple sensors in said subset, wherein allocate said section of said display screen to said subset includes dividing a number of said multiple sensors in said subset into a total number of said multiple sensors to determine a size of the section; and
  - display a color that represents said similar parameter values in said section.

\* \* \* \* \*